United States Patent
Bomber et al.

(10) Patent No.: US 7,733,230 B2
(45) Date of Patent: Jun. 8, 2010

(54) MOBILE READPOINT SYSTEM AND METHOD FOR READING ELECTRONIC TAGS

(75) Inventors: Karen Bellum Bomber, Boca Raton, FL (US); Edward P. Ellers, Lake Worth, FL (US); Roy C. Hannes, Sunrise, FL (US); Sergio M. Perez, Lake Worth, FL (US); Dale W. Raymond, Boca Raton, FL (US); Robert Simone, Lake Worth, FL (US); Herbert Melvin Todd, Lake Worth, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 322 days.

(21) Appl. No.: 11/782,409

(22) Filed: Jul. 24, 2007

(65) Prior Publication Data

US 2008/0024306 A1     Jan. 31, 2008

Related U.S. Application Data

(60) Provisional application No. 60/833,521, filed on Jul. 26, 2006.

(51) Int. Cl.
    *G08B 13/14*     (2006.01)

(52) U.S. Cl. .................... 340/572.7; 340/572.4
(58) Field of Classification Search ............. 340/572.7, 340/572.1, 572.4; 235/375, 439
See application file for complete search history.

(56) References Cited

U.S. PATENT DOCUMENTS

| | | | |
|---|---|---|---|
| 6,346,885 B1 * | 2/2002 | Curkendall | 340/572.4 |
| 7,057,492 B2 * | 6/2006 | Jackson et al. | 340/572.7 |
| 2004/0212493 A1 * | 10/2004 | Stilp | 340/572.1 |
| 2005/0200457 A1 | 9/2005 | Bridgelall et al. | |
| 2006/0113369 A1 | 6/2006 | Taylor et al. | |

FOREIGN PATENT DOCUMENTS

| WO | 2005076929 A2 | 8/2005 |
|---|---|---|
| WO | 2006076283 A1 | 7/2006 |

* cited by examiner

*Primary Examiner*—John A Tweel, Jr.
(74) *Attorney, Agent, or Firm*—Christopher & Weisberg, P.A.

(57) ABSTRACT

A self-contained, integrated mobile readpoint unit capable of reading at least one electronic tag that includes a housing, a power source located proximate the housing, at least one reader located proximate the housing that is capable of reading from and writing to the at least one tag and receives power from the power source, and a repositionable antenna structure that includes at least one readpoint antenna capable of communicating a signal to and from the electronic tag.

19 Claims, 7 Drawing Sheets

MOBILE READPOINT SYSTEM AND METHOD FOR READING ELECTRONIC TAGS

CROSS-REFERENCE TO RELATED APPLICATION

This application is related to and claims priority to U.S. Provisional Application Ser. No. 60/833,521, filed Jul. 26, 2006, entitled MOBILE DEVICE FOR READING ELECTRONIC TAGS, the entirety of which is incorporated herein by reference.

STATEMENT REGARDING FEDERALLY SPONSORED RESEARCH OR DEVELOPMENT n/a

FIELD OF THE INVENTION

The present invention relates to a system and method for identifying and managing assets and merchandise, and more specifically to managing electronic tags using a mobile readpoint system.

BACKGROUND OF THE INVENTION

Efficiently and accurately reading from, and writing to, electronic tags, e.g., radio frequency identification ("RFID") tags, attached to merchandise, packaging or other assets that may be located in a building such as on the floor of a retail store, stored in a retail backroom or warehouse, is an important aspect of supply chain and inventory management.

In traditional inventory management systems, such as warehouse management operations, bar codes are attached to the loads, merchandise, and packaging or to mark specific locations. In a typical example of such a system, the operator uses a hand-held bar code scanner to read the bar code on the loads and, in some cases, on the stock locations. Such a system can be difficult to completely implement, due partly to the need for direct line of sight, close proximity, and proper alignment between the scanner and barcodes. Certain locations, for example high storage shelves and loading docks, often are particularly difficult places for using bar codes because of the need for close proximity between the codes and the reader. As a result, loads in those areas are often visually identified instead.

RFID tag systems have been proposed for use in inventory tracking. RFID tags typically include an integrated circuit ("IC") that is operatively coupled to an antenna of the tag. The tag may also be active and have a battery, or it may be passive and have no battery and obtain operating energy from an external reader. RFID tags without batteries may be preferred for applications in which lower cost is a dominant factor, and RFID tags with batteries may be preferred for applications in which a longer read range is preferred. Either or both may be used in conjunction with the present invention.

In some applications, such as RFID, there is a need to not only read from the tags but also to program them. For example, there are some inventory tracking systems that deploy fixed RFID readers at various locations to detect RFID-tagged items when these RFID-tagged items are positioned near the RFID reader-equipped locations. An RFID reader is a device that is capable of not only reading from the tags, but also capable of programming, e.g., writing data, to the tags. The installation of RFID readers at every inventory location, however, is not cost effective. For example, there are the additional costs for the infrastructure to support the deployment of the fixed RFID readers. These costs can include, the cost of the additional tag readers, antennas, cabling required to connect all the fixed RFID readers and antennas, and the additional power drops for fixed RFID readers and antennas.

Some attempts to resolve the issues of cost and coverage include the use of "ad hoc" carts which are not specifically designed with sufficient flexibility to meet the customer needs of reading and writing to RFID tags/labels from ground level to elevated heights. Many of these "ad hoc" carts are not self-contained, or the carts must be tethered to a power source for operation, which greater limited their mobility.

In other attempts, retailers have also "rigged" a cart, e.g., sometimes even a shopping cart, by placing both merchandise pricing equipment, and RFID reader and antenna hardware on the cart and pushing it around the retail floor or storeroom. These "rigged" carts are typically unwieldy and hard to push due to the uneven weight distribution of the equipment placed in them. In addition, these "rigged" carts are often difficult to maneuver as these carts may be large and many times are too large to fit down aisles without interfering with shopping customers. Because these homegrown systems are not intended for mobile operation, the read range is also limited as such RFID tags at high locations may not be read accurately, if at all.

Others have tried to address just the RFID hardware aspects by dedicating a cart to RFID. The "RFID-dedicated" carts are typically low to the ground, e.g., often less than 3.5 feet tall, and the RFID hardware is mounted on the cart, typically by using various clamps, tie-wraps and tape. The fixed antennas are mounted on the cart and can be up to 7 feet in length, which still causes problems with overall weight and maneuverability. These "RFID-dedicated" carts may also become unbalanced with a tendency to tip over. These "RFID-dedicated" carts are also often distracting to customers. Additionally, retailers still have to return to the same merchandise with another cart to address other activities, e.g., sales displays and pricing activities. Even with such unwieldy antennas, these carts still may have limited read ranges.

A system is therefore needed that allows for the efficient interaction, e.g., reading and writing, with electronic tags on the products and items that better addresses issues of cost, complexity, safety, size, mobility, and ease of use.

SUMMARY OF THE INVENTION

The present invention advantageously provides a method and system for locating and managing tagged objects in a read zone using a mobile readpoint unit.

In accordance with one aspect, the present invention advantageously provides a self-contained, integrated mobile readpoint unit that can read at least one electronic tag. The self-contained, integrated mobile readpoint unit has a housing, a power source located proximate the housing, and at least one reader located proximate the housing. The reader reads from and writes to at least one tag. The reader also receives power from the power source. The integrated mobile readpoint unit also has an antenna structure that includes at least one readpoint antenna that communicates a signal to and from the electronic tag.

In accordance with another aspect, the present invention provides a method for locating and managing tagged objects in a read zone using a mobile readpoint unit. The method includes establishing a repositionable read zone using at least one readpoint antenna coupled to an antenna tower, and using a readpoint antenna to query the electronic tag. The electronic tag contains tag information and is coupled to an object of interest In accordance with another aspect, the present invention provides a method for locating and managing tagged objects in a read zone using a mobile readpoint unit. The method includes establishing a repositionable read zone using at least one readpoint antenna coupled to an antenna tower, and using a readpoint antenna to query the electronic tag. The electronic tag contains tag information and is coupled to an object of interest. In accordance with one aspect, the present invention advantageously provides a system for locating and managing tagged objects in a read zone. The system includes a self-contained, integrated mobile readpoint unit that can read at least one electronic tag. The mobile readpoint unit has a housing, a power source located proximate the housing, and at least one reader located proximate the housing. The reader reads from and writes to at least one tag. The reader also receives power from the power source. The integrated mobile readpoint unit also has an antenna structure that includes at least one readpoint antenna that communicates a signal to and from the electronic tag. The system further includes a processor that operates to establish a repositionable read zone using the at least one readpoint antenna coupled to an antenna tower. The processor also operates to query an electronic tag using the at least one readpoint antenna, the electronic tag coupled to the object and having tag information.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
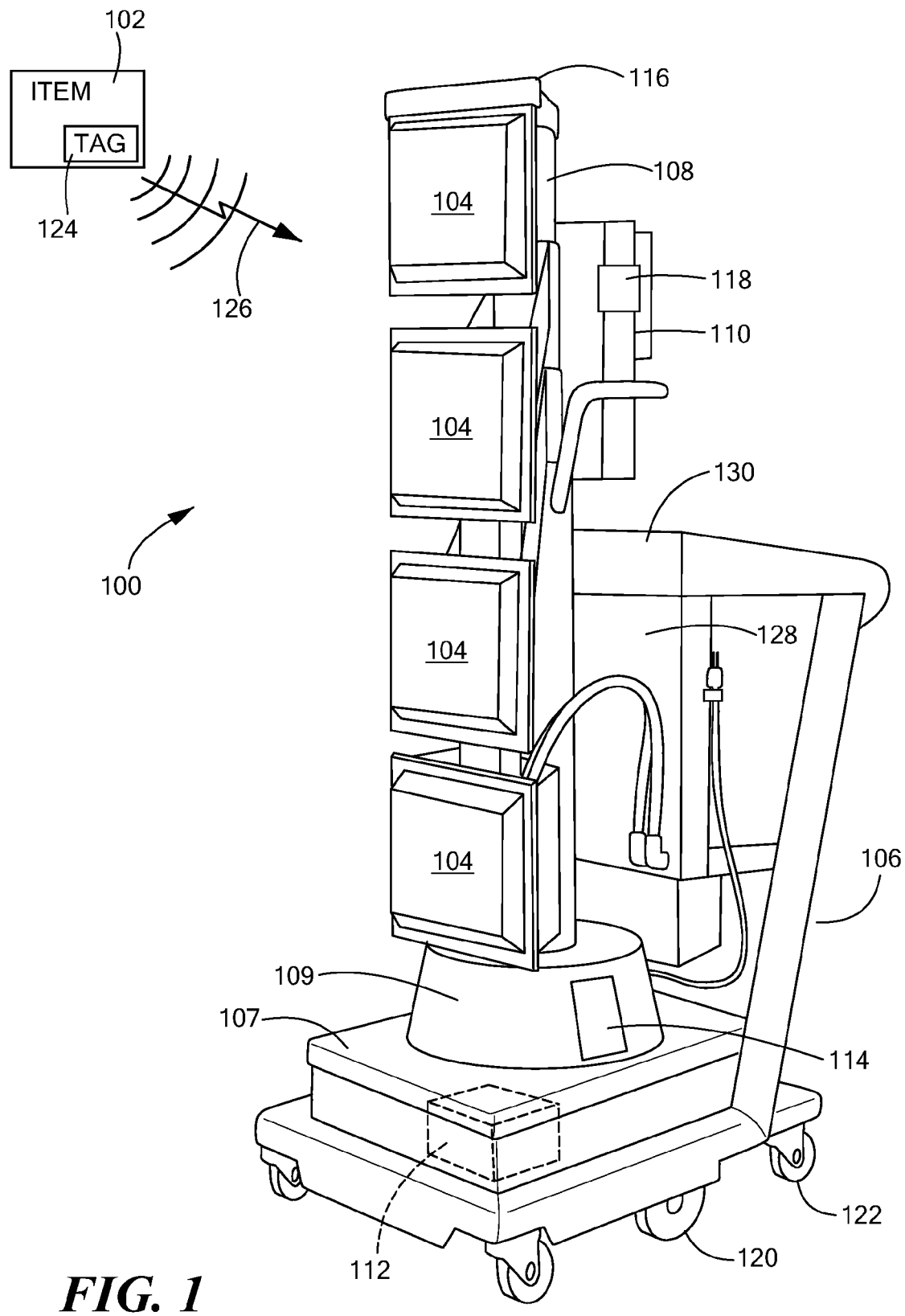
FIG. 1 is a diagram of a mobile readpoint system constructed in accordance with the principles of the present invention.

Referring now to the drawing figures in which like reference designators refer to like elements, there is shown in FIG. 1 a diagram of an exemplary system constructed in accordance with the principles of the present invention and designated generally as "100". System 100 manages at least one item 102 using a mobile readpoint antenna 104, e.g., a radio frequency identification ("RFID") antenna. More specifically, system 100 facilitates any person or entity to track, locate, identify, process, filter, or otherwise manage a plurality of items 102 by using a mobile readpoint unit 106 coupled with one or more readpoint antennas 104 that can also include hand-deployable readpoint antennas 104.

Figure 2:
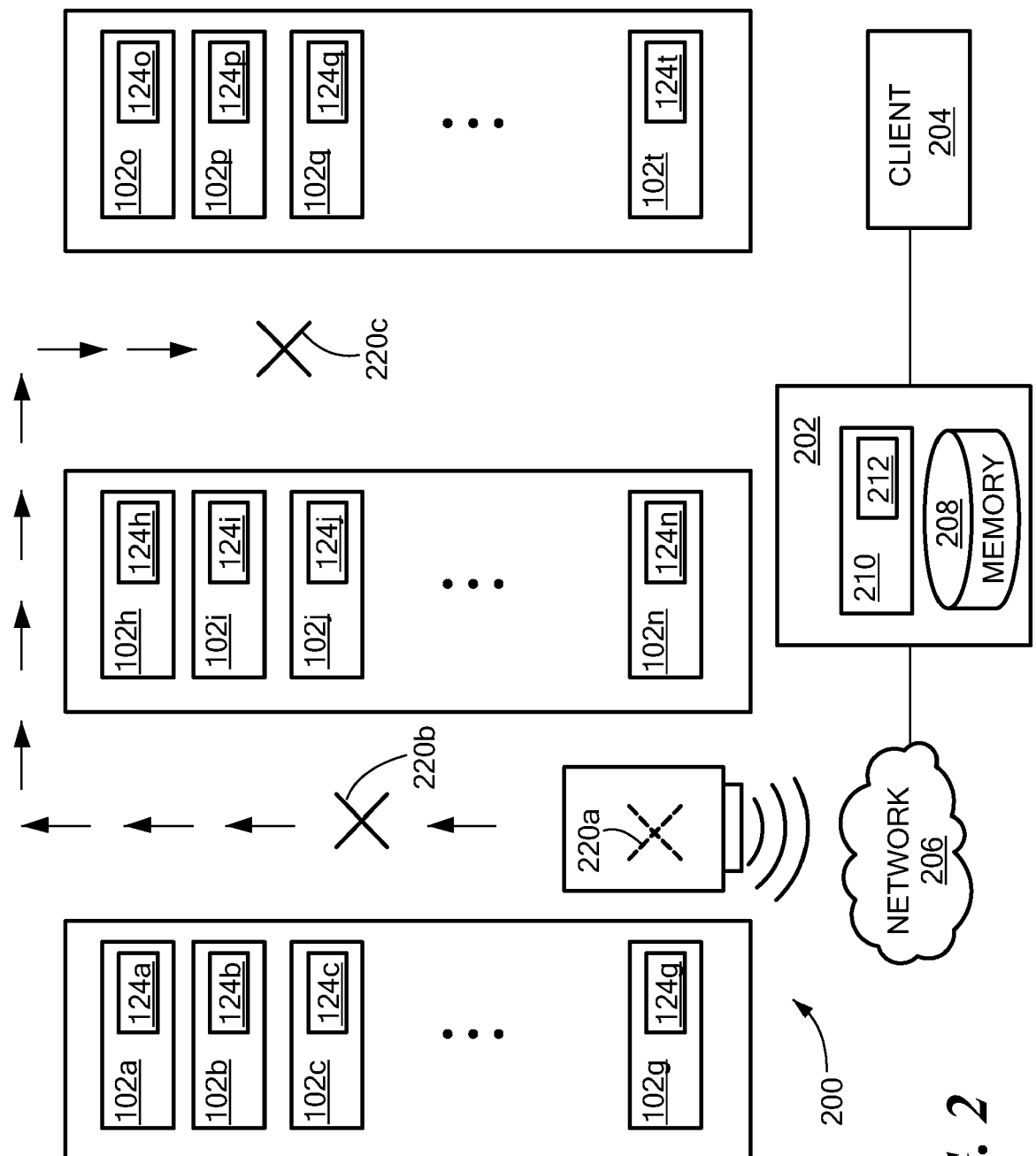
FIG. 2 is a diagram of another embodiment of a mobile readpoint system constructed in accordance with the principles of the present invention.

System 100 can be implemented in all or a portion of any appropriate location including, for example, a shopping center, grocery store, factory, or warehouse (as illustrated in more detail in FIG. 2). These locations may include thousands or even millions of items 102 stored across tens of thousands of square feet. Accordingly, these large locations may be difficult to automatically inventory or locate individual items 102 because, when items 102 are stacked one on the other, especially on metallic racks or shelving, the interrogation signal can be significantly attenuated or blocked. Moreover, interference from other electromagnetic devices, other readers, other tags or markers and the like can mask the reply signal of a tag, thereby causing an erroneous inventory count by system 100. Of course, system 100 may be of any size or configuration that includes one or more tagged items 102 and can be scanned using mobile readpoint unit 106, which can include an optional hand-held readpoint antenna 104. For example, the exemplary system 100 shown in FIG. 1, has mobile readpoint unit 106 that can include a housing 107, a vertically expandable antenna tower 108 with four high-powered readpoint antennas 104 mounted in or proximate a rotatable platform 109 of the housing 107, and capable of being powered by an onboard power source 112, a electronic tag reader 110 in or proximate the housing 107 and capable of being powered by the onboard power source 112, an optional onboard power source charger 114, a contact sensor 116 location at the top of the expandable antenna tower 108 and an onboard wireless link 118 for communications with customer inventory management systems. Mobile readpoint unit 106 can further include two central fixed wheels 120 and four pivoting casters 122 mounted to the housing 107 for improved maneuverability.

Mobile readpoint unit 106 is any device operable to physically travel or relocate among or around a plurality of items 102 such that readpoint antenna 104 may be considered relatively portable. For example, mobile readpoint unit 106 may be a flatbed, a forklift, a robot, an airport shuttle cart, an airport luggage cart, or any other suitable vehicle or mobile mechanism of any appropriate size to accommodate and to integrate at least one readpoint antenna 104. In certain embodiments, mobile readpoint unit 106 may be a hand-pushed device, a self-propelled device or an electronic device operable to automatically relocate according to preset commands or algorithms or a dynamically determined path. Mobile readpoint unit 106 includes at least one readpoint antenna 104 that can be mounted on an antenna tower 108, an electronic tag reader 110, and onboard power source 112. Generally, power source 112 can be any suitable battery or fuel source operable to (at least partially) drive mobile readpoint unit 106 and power readpoint antenna 104 and electronic tag reader 110. The power source 112 can be, for example, single use or rechargeable batteries, such as lithium ion, nickel metal hydride, and the like. Illustrated mobile readpoint unit 106 also can include an on-board computer 128 with graphical user interface 130, and a control switch (not shown) to add additional functionality to mobile readpoint unit 106 or for ease or efficiency of the operator; however, these components are optional and may not be present in some mobile readpoint units 106.

Figure 3:
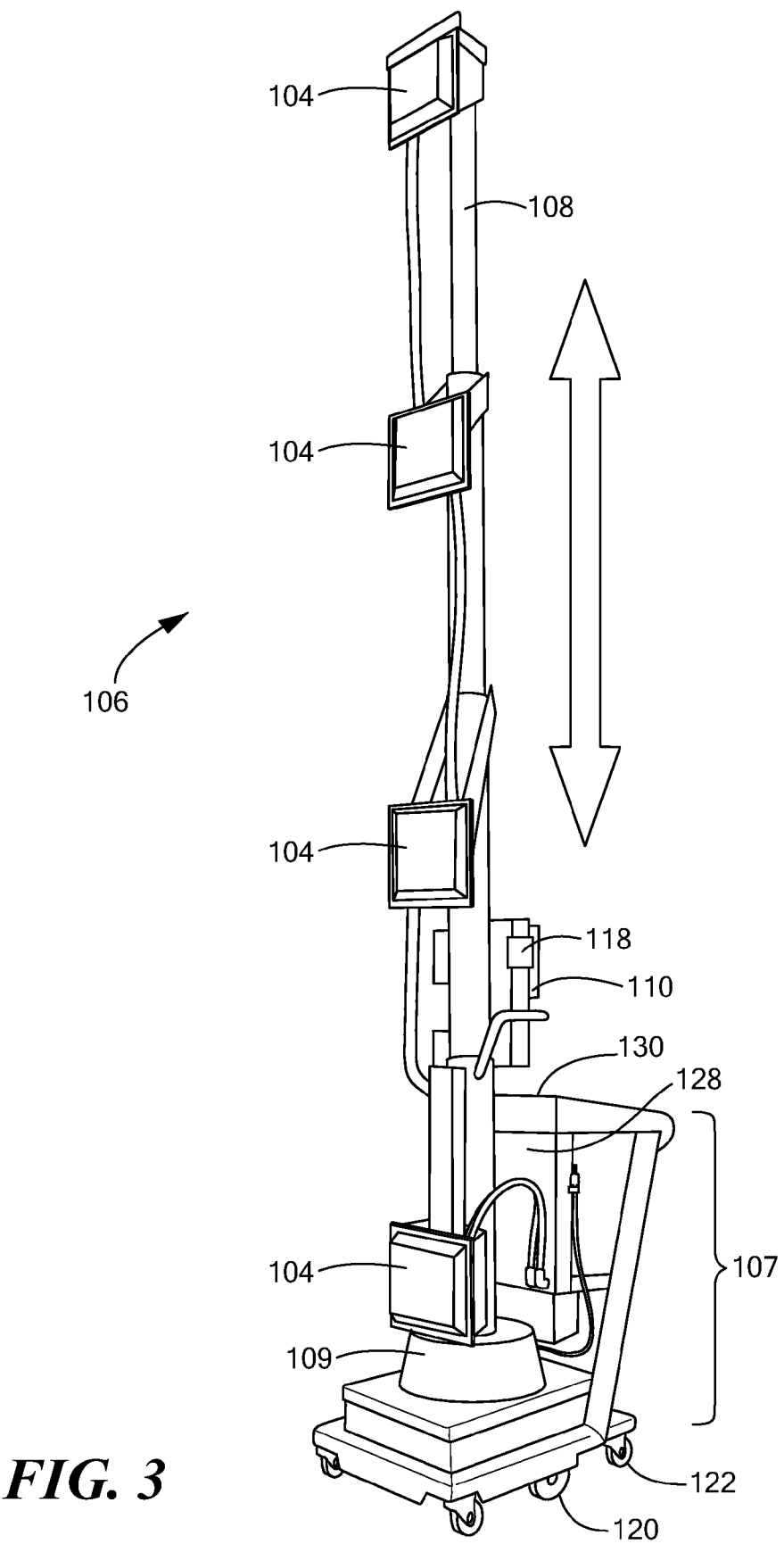
FIG. 3 is a diagram of another embodiment of a mobile readpoint system that has its antenna tower extended in accordance with the principles of the present invention.

Readpoint antenna 104 is any antenna constructed in accordance with the principles of the present invention that is operable to communicate using RFID communications. For example, readpoint antenna 104 can be implemented as a portable antenna and operable to communicate with electronic tags 124. Readpoint antenna 104 can communicate with mobile readpoint unit 106 using any appropriate technique including the use of wired or wireless communications or directly embedding readpoint antenna 104 in mobile readpoint unit 106. As illustrated in FIG. 1, an embodiment of the invention can include an extendable antenna tower 108. The extendable antenna tower 108 can deploy the readpoint antennas 104 to extended heights. A fully deployed antenna tower 108 is illustrated in FIG. 3, discussed below in detail. In this embodiment, the fully deployed antenna tower 108 enables the creation of a repositionable read zone; also referred to as an interrogation zone, which extends in the vertical direction from the floor to a height of sixteen feet. The antenna tower 108 can be extended to any height within its extension range as necessary for a given application. The power to the antennas 104 can be varied to control the repositionable read zone in a horizontal direction.

The extendable antenna tower 108 can be mounted to the rotatable platform 109 of the housing 107 of the mobile readpoint unit 106. The rotatable platform 109 permits a 180 degree rotation of the readpoint antennas 104 that advantageously provides mobile readpoint unit 106 the capability to read in a range of directions, e.g., left side, right side and forward, without hardware change out. For example, in operation, the mobile readpoint unit 106 can travel along a path, e.g., a narrow aisle of a warehouse, and rotate the extendable antenna tower 108 to the right to read electronic tags on the right side as it travels down the aisle. The extendable antenna tower 108 then can be rotated to the left, e.g., 180 degrees, to read electronic tags on the left side of the aisle as it reverses direction to travel back up the aisle.

Alternatively, each antenna 104 may be oriented in a particular direction. For example, mobile readpoint unit 106 may have a first antenna 104 attached to one side of mobile readpoint unit 106 and a second antenna 104 that is a portable hand-held antenna on the other side. This placement would allow the first fixed antenna 104 to be oriented in one direction while allowing the second portable hand-held antenna 104 to be deployed as needed and thereby allowing mobile readpoint unit 106 to more efficiently collect tag information 126 for a given interrogation zone. Regardless of the number or orientation, each readpoint antenna 104 is part of or communicably coupled with electronic tag reader 108.

Motion of the extendable antenna tower 108 elevation, extendable antenna tower 108 rotation, and the movement of the mobile readpoint unit 106 can be powered by electric, hydraulic, and/or pneumatic devices or can be manually operated. For example, the extendable antenna tower 108 can use a single electric motor controlled by a lift control lever to elevate the deployable readpoint antennas 104 to create a repositionable read zone to cover the desired height of inventory. In other words, lifting the control lever raises the antenna tower 108 and pressing the control lever down lowers the antenna tower 108. The lift mechanism of the extendable antenna tower 108 can have a variable speed control, so slightly depressing the control lever causes the extendable antenna tower 108 to move slowly while fully depressing the control causes the extendable antenna tower 108 to move at full speed. The control lever can be used to partially or fully deploy the extendable antenna tower 108. As the extendable antenna tower 108 is extended, the readpoint antennas 104 are deployed in a proportional matter, which advantageously creates a substantially uniform read zone for the full deployed length of the extendable antenna tower 108. The use of proportional spacing of readpoint antennas 104 minimizes gaps in the read zone and thus provides inventory counts with a higher degree of accuracy.

Mobile readpoint unit 106 uses at least one electronic tag reader 110 to monitor, query, or otherwise process data from readpoint antennas 104. Electronic tag reader 110 is any device, such as a transceiver, operable to communicate with electronic tags 124 through one or more readpoint antennas 104. As described in more detail with reference to FIG. 2, electronic tag reader 110 may also be compatible to communicate, via wireless or wireline signals, with other computers such as onboard or local computer 128 and remote server 202. In certain embodiments, electronic tag reader 110 operates at one frequency compatible with electronic tags 124 or at numerous frequencies to accommodate numerous disparate electronic tags 124, as well as with server 202 (see FIG. 2) for example. Electronic tag reader 110 may also include an encoder/decoder or other secured communication device. In certain embodiments, electronic tag reader 110 is communicably coupled with computer 128.

Onboard computer 128 is any local processing device such as a laptop, blade, personal data assistant ("PDA"), etc. operable to manage, filter, or otherwise process electronic tag information 126. Local computer 128 may be communicably coupled with mobile readpoint unit 106 using any appropriate technique. For example, local computer 128 may be a laptop that rests on a work space of mobile readpoint unit 106, a PDA carried by the operator of mobile readpoint unit 106, or a processing device embedded within mobile readpoint unit 106. The work space of mobile readpoint unit 106 can be used for a software interface and staging of electronic tags 124 as needed. In addition, the mobile readpoint unit 106 can have a series of shelves and drawers for storing merchandising and pricing products and equipment.

In some embodiments, computer 128 may be wirelessly connected to other computers for subsequent processing or viewing of tag information 126. Moreover, computer 128 includes a central processing unit, memory, input/output devices and communication hardware and may also execute any appropriate off-the-shelf, proprietary or customized applications. Computer 128 also can include software and/or firmware operable to perform the processes described herein. For example, the software and/or firmware can include, but is not limited to, applications that check inventory accuracy, find inventory items, signal alerts, correlate electronic tag location, communicate proper placement of product, e.g., based on tag information, and automate mobile readpoint 106 movement.

For example, this software may be written or described in any appropriate computer language including C, C++, Java, and others known or developed in the art. In certain embodiments, this software may also include or be communicably coupled with an onboard database for storing the collected electronic tag information 126. In some of these embodiments, local database may be a relational database comprising one or more tables described in terms of structured query language ("SQL") statements or scripts. In other embodiments, the local database may store or define various data structures as text files, eXtensible Markup Language ("XML") documents, Virtual Storage Access Method ("VSAM") files, etc. In some embodiments, computer 128 also includes or is communicably coupled with a graphical user interface ("GUI").

In many cases, a GUI comprises a graphical user interface operable to allow the operator or other user of mobile readpoint unit 106 to interface with computer 128 to view information associated with the one or more items 102. Generally, GUI provides the user of mobile readpoint unit 106 with an efficient and user-friendly presentation of data, namely information from electronic tags 124. A GUI may comprise a plurality of frames or views having interactive fields, pulldown lists, and buttons operated by the user. In one embodiment, the GUI communicates one or more web pages presenting information for at least a portion of the queried electronic tags 124 or presenting operational information, e.g., battery level, antenna tower deployment height, etc., of the mobile readpoint unit 106. The GUI may also present summarized or filtered information 126. It should be understood that the term graphical user interface may be used in the singular or in the plural to describe one or more graphical user interfaces and each of the displays of a particular graphical user interface. Further, a GUI can include any graphical user interface, such as a generic web browser, a touch screen, or a text interface, which processes information in system 100 and efficiently presents the information to the operator. In certain embodiments, computer 128 may receive commands from the operator through the GUI, as well as other input devices, such as a mouse or keyboard.

The mobile readpoint unit 106 also can include a media subsystem that has one or more cameras (not shown) mounted on the extendable antenna tower 108 and housing 107, and a video recorder (not shown). The cameras can be digital or analog, black/white or color and provide enough detail to allow for the discrimination of the necessary image details. The video recorder is used to capture and store the image captured by the cameras. Captured images can also be transmitted to the server 202 or client 204 instead of the video recorder if local recording of the video is not required. Use of Pan/Tilt/Zoom cameras can allow a local or remote operator to receive more details about the electronic tag location.

For example, when an electronic tag 124 is read and located, it may be positioned on a shelf that is at an elevated height, such as ten feet high. Normally an employee would be compelled to obtain a ladder and travel to the location of the electronic tag 124 to visually identify the subject item 102. This wastes time and resources. Using the cameras of mobile readpoint unit 106 allows a local or remote operator to view and zoom in on the subject item 102 and then identify the item 102 without having to physically climb to the actual location of the subject item 102. In addition, the media subsystem can provide for archiving of video and audio locally via video recorder. In another embodiment, a database located at server 202 or client 204 provides for remote archiving of video and audio.

As used herein, items 102 may each be any component, device, commodity or other product or article operable to be tagged using electronic tags 124. For example, these items 102 may include electronic devices, luggage, groceries, boxes, or various others. These tagged items 102 are associated with a plurality of electronic characteristics including, for example, serial number, color, price, manufacturer, and other identifying data using tag information 126. Typically, this tag information 126 is associated with item 102 by being stored or referenced in electronic tag 124. Optionally, the tag information 126 may be stored in a database (not shown). Although an RFID embodiment is used to describe the present invention, the present invention is not limited to RFID as it can be applied to other technologies such as electronic article surveillance ("EAS") using for example, P-mag, J-wire, Swept RF, etc.

Electronic tag 124 is affixed to item 102. Generally, electronic tag 124 is any component operable to communicate radio signals or other wireless communications that include identifying information 126. Electronic tag 124 is typically a small component that may be attached, affixed or otherwise secured to item 102. In some embodiments, electronic tag 124 may be secured in such a way that removal will disable tag 124 or activate some other security feature.

FIG. 2 is a block diagram of an item management system 200 for managing one or more electronic tagged items 102. At a high level, item management system 200 is operable to manage, process, or otherwise track a plurality of items 102 based on information retrieved from each item's electronic tag 124 using mobile readpoint unit 106. In other words, system 200 is any networked, wireless, and/or other RFID-compatible environment and may be or include a store, manufacturing plant, a warehouse, a shipping point, a dealership, and/or other item locations operable to automatically collect and process information from the electronic tags 124.

For example, illustrated system 200 is a warehouse with a plurality of shelved items 102, one or more mobile readpoint units 106, server 202, client 204, and/or other remote computing device for processing the retrieved information. The warehouse may provide one or more employees or other personnel with one or more mobile readpoint units 106 for efficiently processing items 102. Using the mobile readpoint unit 106, the operator may push, direct, or command mobile readpoint unit 106 to a first location (e.g., location 220a) to query any items 102 within range of readpoint antennas 104. In one embodiment, a hand-held antenna 104 (not shown) can be deployed to verify that all items 102 are located, especially where items 102 are stacked or shelved on metallic racks. Mobile readpoint unit 106 may then move or relocate from location (e.g., location 220b) to location (e.g., location 220c) as desired. Once mobile readpoint unit 106 collects any suitable amount of tag information 126, mobile readpoint unit 106 can wirelessly communicate this information via a communication link, e.g., implementing IEEE 802.11g protocols, to server 202 or client 204 via network 206 for subsequent processing or viewing.

Server 202 is any computer that can perform the functions described herein and is in data communication with any number of clients 204 and/or other network devices such as switches or routers, printers, docking stations, or others. For example, server 202 can be a blade server, a mainframe, a general-purpose personal computer ("PC"), a Macintosh, a workstation, a Unix-based computer, a web or email server, or any other suitable device. FIG. 2 only illustrates one example of computers that may be used with the invention. For example, although FIG. 2 illustrates one server 202 that may be used with the invention, system 200 can be implemented using computers other than servers, as well as a server pool. Computers other than general purpose computers as well as computers without conventional operating systems can be used.

As used in this document, the term "computer" is intended to encompass a personal computer, workstation, network computer, or any other suitable processing device. Computer server 202 may be adapted to execute any operating system including Linux, UNIX, Windows or any other suitable operating system so long as server 202 remains operable to process native or filtered RFID data. Server 202 typically includes an interface for communicating with the other computer systems, such as client 204, over network 206 in a client-server or other distributed environment. Generally, the interface has logic encoded in software and/or hardware in a suitable combination and operable to communicate with network 206. More specifically, the interface may implement software supporting one or more communications protocols associated with communications network 206 or hardware operable to communicate physical signals. In short, server 202 may be any computer with software and/or hardware in any combination suitable to receive or retrieve information 126, e.g., RFID information, from electronic tags 124 (via electronic tag reader 108), generate web pages or other output based on the item RFID data 126, and communicate the output to users of one or more clients 204 via network 206.

Network 206 facilitates wireless or wireline communication between computer server 202 and any other computer. Network 206 may communicate, for example, Internet Protocol ("IP") packets, Frame Relay frames, Asynchronous Transfer Mode ("ATM") cells, voice, video, data, and other suitable information between network addresses. Network 206 may include one or more local area networks ("LANs"), radio access networks ("RANs"), metropolitan area networks ("MANs"), wide area networks ("WANs"), all or a portion of the global computer network known as the Internet, and/or any other communication system or systems at one or more locations.

Server 202 further includes memory 208 and processor 210. Memory 208 may include any memory or database module and may take the form of volatile or non-volatile memory including, without limitation, magnetic media, optical media, random access memory ("RAM"), read-only memory ("ROM"), removable media, or any other suitable local or remote memory component. Memory 208 typically includes collected tag information 126, but may also include any other suitable data including security logs, web logs, HTML pages and templates, word documents, emails, and others.

Server 202 also includes processor 210. Processor 210 executes instructions and manipulates data to perform the operations of server 202 and may be, for example, a central processing unit ("CPU"), an application specific integrated circuit ("ASIC") or a field-programmable gate array ("FPGA"). Although FIG. 2 illustrates a single processor 210 in server 202, multiple processors 210 may be used according to particular needs, and reference to processor 210 is meant to include multiple processors 210 where applicable. In certain embodiments, processor 210 executes one or more processes associated with RFID application 212.

RFID application 212 includes any hardware, software, firmware, or combination thereof operable to collect or receive RFID information 126 from mobile units 106. For example, RFID application 212 may receive RFID information 126, process it according to various algorithms, and store the processed data in memory 208. The processing may include mapping the various tagged items 102 using the RFID technology, embedding information 126 for each tagged item 102 in a webpage, summarizing collected RFID data, and such. RFID application 212 may be written or described in any appropriate computer language including C, C++, Java and others known or developed in the art. In one embodiment, RFID application 212 may be referenced by or communicably coupled with applications executing on client 204 or mobile readpoint unit 106.

Figure 4:
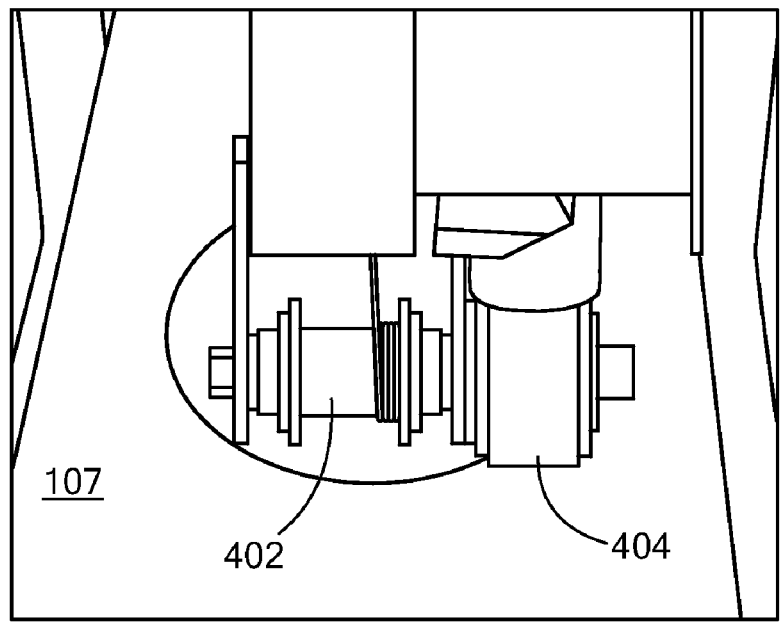
FIG. 4 is a diagram of an adjustable clutch coupled to a lift motor to limit the force applied to an extendable antenna tower and constructed in accordance with the principles of the present invention.

The mobile readpoint unit 106 may further include various safety features or elements. For example, mobile readpoint unit 106 can include a brake system to immediately stop movement of the mobile readpoint unit 106 when an operator releases or looses control. In an embodiment, a contact sensor 116 is located at the top of the extendable antenna tower 108 and functions to immediately reverse the upward motion of the extendable antenna tower 108 when an overhead obstruction is contacted. In another embodiment, as illustrated in FIG. 4, an adjustable clutch 402 on the lift motor 404 limits the force to the extendable antenna tower 108 which prevents potential abuse of the mobile readpoint unit 106, such as if an operator attempts to ride the extendable antenna tower 108 as it is being deployed.

Figure 5:
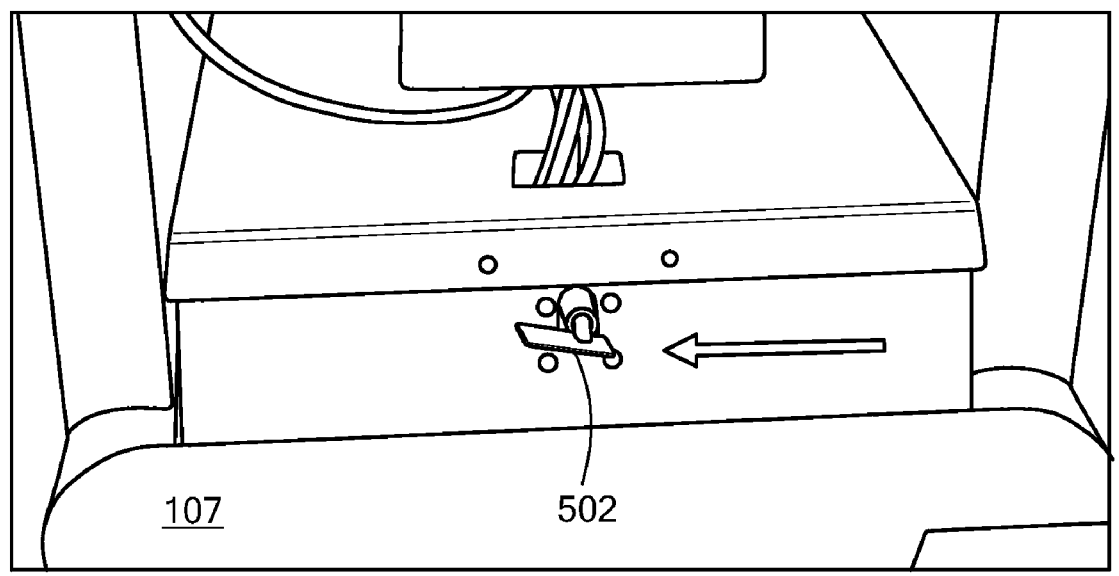
FIG. 5 is a diagram of a main-power cut-off switch used to control power to the mobile readpoint unit and constructed in accordance with the principles of the present invention.

In one embodiment, as illustrated in FIG. 5, a main-power cut-off switch 502 can be used to supply power to the mobile readpoint unit 106. The keyed switch 502 can also be used to restrict operation of the mobile readpoint unit 106 to operators having the correct key. The keyed switch 502 can also be configured to control certain functions of the mobile readpoint unit 106 based on the position of the keyed switch. For example, when set to the "Off" position, battery power to the mobile readpoint unit 106 may be disconnected. When set to the "On" position, battery power can be connected to mobile readpoint unit 106 activating the tag readers 110 and an Ethernet switch 118. Batteries 112 may be charged with the main power cut-off switch in either position. The keyed switch 502 can also provide power to the lift mechanism of extendable antenna tower 108. The keyed switch 502 is provided so that the use of the lift mechanism of extendable antenna tower 108 can be limited to personnel who have been authorized and trained in its use and its safety precautions.

Figure 6:
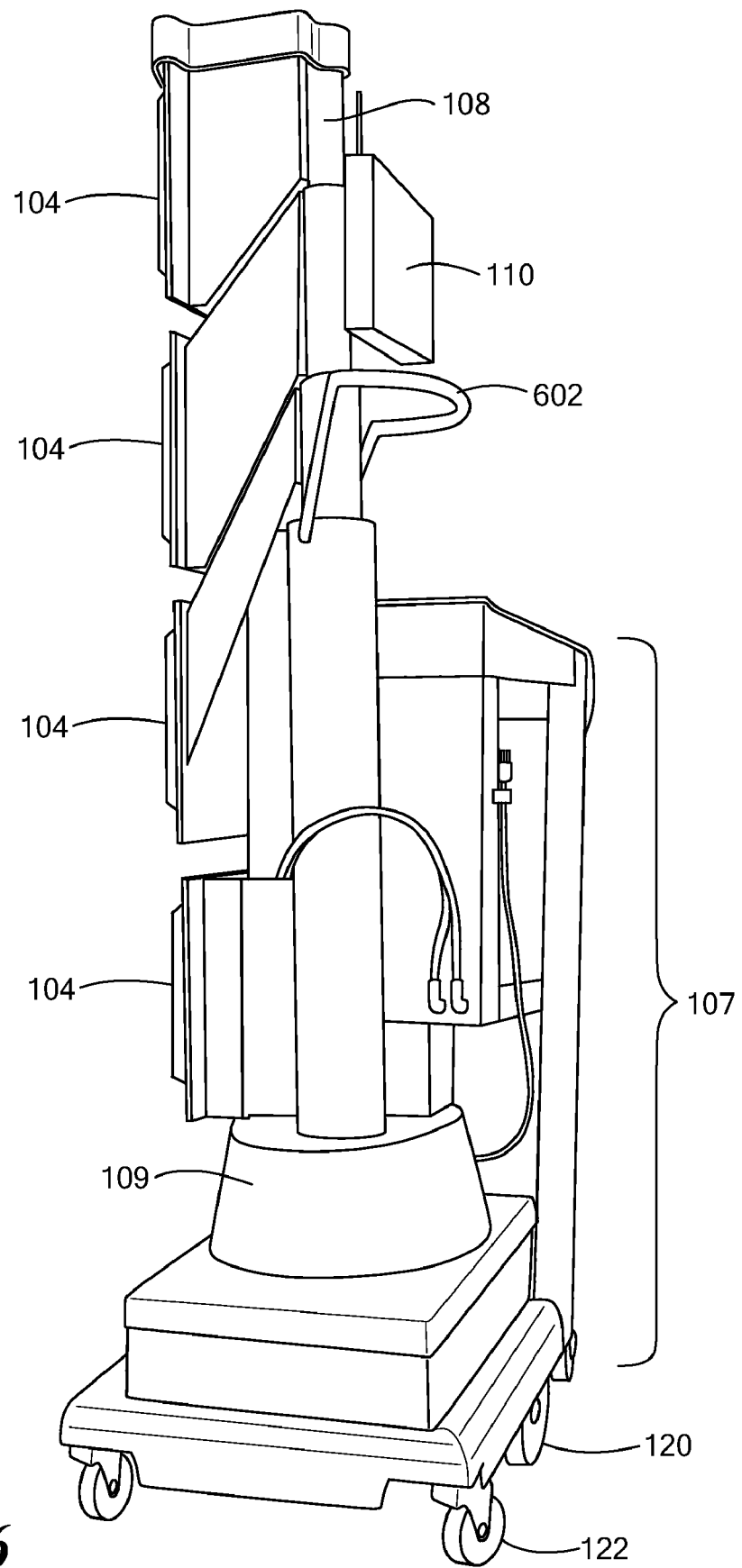
FIG. 6 is a diagram of a curved hand attached to extendable tower of the mobile readpoint unit and constructed in accordance with the principles of the present invention.
Figure 7:
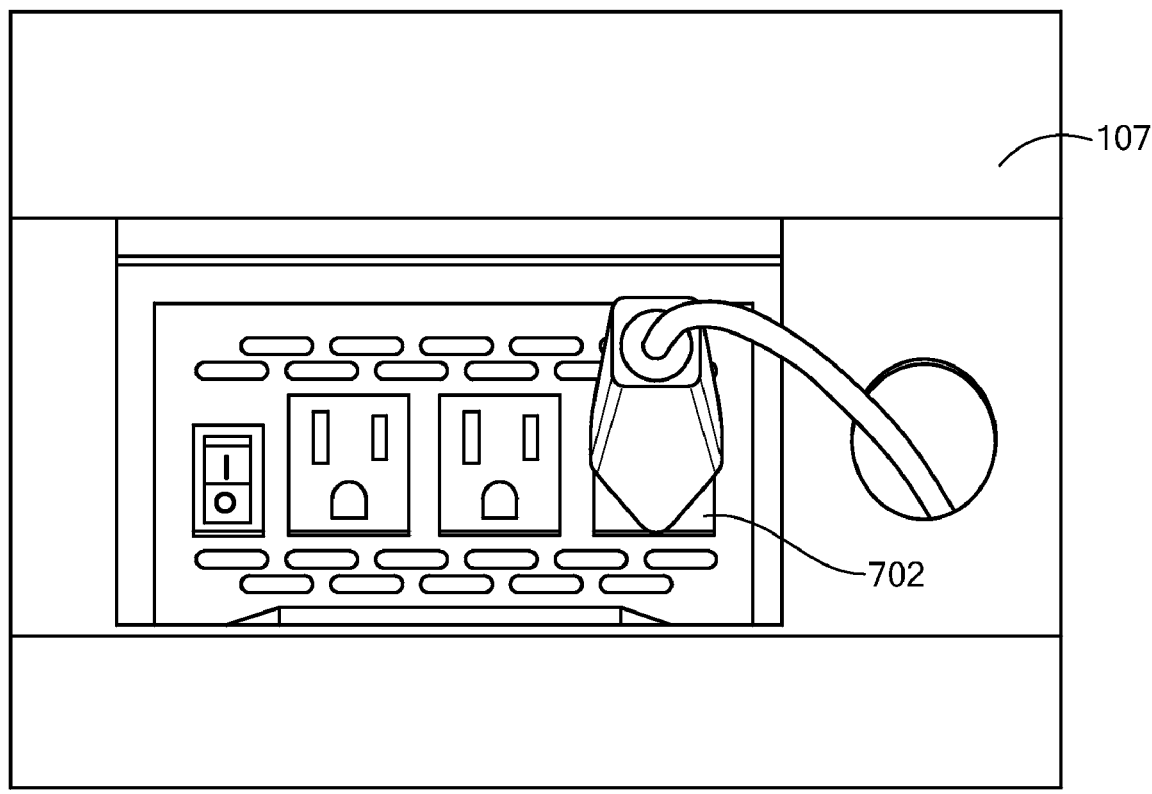
FIG. 7 is a diagram of a power outlet that provides a power supply for portable devices and constructed in accordance with the principles of the present invention.

In one embodiment, as illustrated in FIG. 6, a curved handle 602 attached to the extendable antenna tower 108 can be used to manually rotate the extendable antenna tower 108 from the left side of an aisle to the right side, and vice versa. In another embodiment, the extendable antenna tower 108 uses an electric motor (not shown) to actuate rotation. In one embodiment, as illustrated in FIG. 7, a power outlet, such as a 110 volt AC socket can be provided as a power connection to a portable processing device, such as laptop computer.

Figure 8:
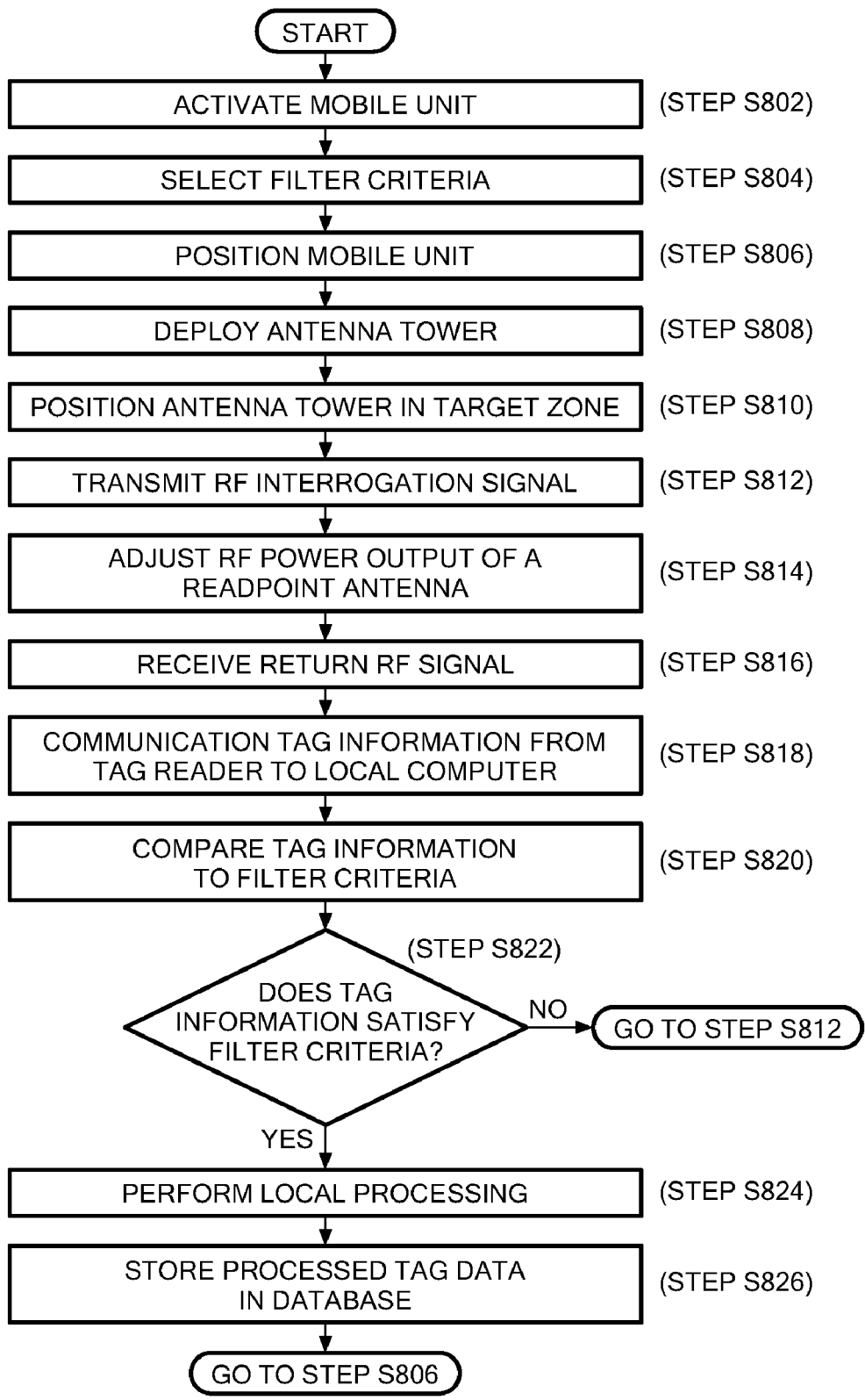
FIG. 8 is a flowchart illustrating an exemplary process for managing electronic tags using a mobile readpoint unit in accordance with the principles of the present invention.

FIG. 8 is a flowchart illustrating an example process for managing RFID tags 124 using a readpoint antenna 104. The process is described with respect to system 100 and, in particular, to a warehouse including local or remote server 202. However, any other suitable system or portion of a system may use appropriate embodiments of the process to retrieve and process RFID information to manage a plurality of electronically tagged items 102. Generally, the process describes an operator pushing or commanding mobile readpoint unit 106 from one location 220 to another such that one or more RFID tags 124 may be queried from an appropriate distance.

At step S802, mobile readpoint unit 106 is activated, powered on, or otherwise initialized. For example, the operator may switch a control switch on a handle of mobile readpoint unit 106 from "off" to "on". This switch may power on or activate the onboard power source 112, electronic tag reader 110, and/or other components of mobile readpoint unit 106. Next, in some embodiments, filter criteria are identified for subsequent filtering of collected tag information 126 at step S804. At step S806, mobile readpoint unit 106 is located at a first location 220a. Of course, if mobile readpoint unit 106 is already at a desired first location 220a, then the relocation may merely be a confirmation of the location 220. When mobile readpoint unit 106 is actually relocated, this movement may be through any technique appropriate for mobile readpoint unit 106. For example, the operator may hand-push mobile readpoint unit 106 to the desired location 220. In another example, the operator may select a predetermined location using computer 116 and its GUI. In yet another example, mobile readpoint unit 106 may automatically relocate using a predetermined route loaded in computer 116 or may dynamically determine a route based on shelving, sensors, or other obstacles and input.

Once mobile readpoint unit 106 is present at the desired location 220, readpoint antenna 104 is enabled at step S808 and the antenna tower 108 with the readpoint antenna 104 is positioned in a target zone to query for objects having an electronic tag 112 (step S810). A tag reader 110 transmits an interrogation signal via the readpoint antenna 104 (step S812) that will create a repositionable interrogation zone. The user can vary the size and strength of the repositionable interrogation zone by adjusting the RF power to the RF antenna element 104 (step S814). For example, when a user believes that some tags within repositionable interrogation zone have not received a query signal from RFID tag reader 110, the RF power output can be increased to overcome electromagnetic interference by other devices or to penetrate stacked boxes and the like, to reach all tags in the repositionable interrogation zone.

At step S816, the electronic tag reader 110 can transmit a subsequent query via the RF antenna element 104 to a first electronic tag 112 within range of readpoint antenna 104 and receives a return RF signal. This query may comprise a request, retrieval, or any other communication that results in tag information 126 at electronic tag reader 110. At step S818, the tag information 126 is communicated to local computer 116. For example electronic tag reader 110 may transmit the collected information 126 to computer 116 via a wireless or wireline link as appropriate. At step S820, computer 116 compares tag information 126 to the filter criteria. If the information satisfies (or fails to satisfy as appropriate) the criteria at decisional step S822, then processing proceeds to step S812. Otherwise, tag information 126 is communicated to example middleware for any suitable local processing at step S824. At step S826, the collected or processed information 126 is stored in a local database or other memory or data module.

Next, electronic tag reader 110 or the operator determines if there are more desired electronic tags 124 or tagged items 102 within range of readpoint antennas 104 and can query the additional tags, or just relocate the mobile readpoint unit 106 to its next location by returning to step S806.

The preceding flowchart focuses on the operation of example systems 100 and/or 200 described in FIGS. 1 and 2 as these example diagrams illustrate various functional elements that implement some or all of the preceding techniques for managing tagged items using mobile readpoint unit 106. However, as noted above, mobile readpoint unit 106, systems 100, and/or 200 can use any suitable combination and arrangement of functional elements for providing these operations, and these techniques can be combined with other techniques as appropriate. Further, various changes may be made to the preceding flowcharts. In other words, many of the steps in these flowcharts may take place simultaneously and/or in different orders than as shown. For example, while the flowchart describes the steps occurring serially, instead mobile readpoint unit 106 may be concurrently moving and querying. Moreover, these systems may implement methods with additional steps, fewer steps, and/or different steps, so long as the methods remain appropriate.

The invention described and illustrated herein allows a single individual to accomplish many electronic tag related tasks such as tag location, reading of tags, writing to tags, and finding exceptions. The invention may be easily operated by a single person either manually or remotely, and could easily maneuver around the store isles aisles without interfering with shopping customers.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A self-contained, integrated mobile readpoint unit capable of reading at least one electronic tag, the integrated mobile readpoint unit comprising:
   a wheeled housing;
   a power source located proximate the housing;
   at least one reader located proximate the housing, the reader being capable of reading from and writing to the at least one electronic tag, and receiving power from the power source; and
   a repositionable antenna structure, the repositionable antenna structure including at least one readpoint antenna capable of communicating a signal to and from the electronic tag,
   the wheeled housing adapted to receive the repositionable antenna structure.

2. The mobile readpoint unit of claim 1, wherein the tag is an RFID tag and the reader is an RFID reader.

3. The mobile readpoint unit of claim 1, wherein the repositionable antenna structure includes an antenna tower.

4. The mobile readpoint unit of claim 3 wherein the antenna tower is extendable to proportionally deploy the at least one readpoint antenna.

5. A self-contained, integrated mobile readpoint unit capable of reading at least one electronic tag, the integrated mobile readpoint unit comprising:
   a housing, wherein the housing includes a rotatable platform;
   a power source located proximate the housing
   at least one reader located proximate the housing, the reader being capable of reading from and writing to the at least one electronic tag, and receiving power from the power source; and
   a repositionable antenna structure, the repositionable antenna structure including at least one readpoint antenna capable of communicating a signal to and from the electronic tag;

the repositionable antenna structure including an antenna tower, the antenna tower mounted to the rotatable platform, and extendable to proportionally deploy the at least one readpoint antenna.

6. A self-contained, integrated mobile readpoint unit capable of reading at least one electronic tag, the integrated mobile readpoint unit comprising:
  a housing;
  a power source located proximate the housing;
  at least one reader located proximate the housing, the reader being capable of reading from and writing to the at least one electronic tag, and receiving power from the power source; and
  a repositionable antenna structure, the repositionable antenna structure including at least one readpoint antenna capable of communicating a signal to and from the electronic tag,
  the housing includes at least one central wheel, the central wheel positioned approximately at the midpoint of a base portion of the housing and coupled to an electric motor, the central wheel propelling the mobile readpoint unit.

7. The mobile readpoint unit of claim 1, further comprising a media subsystem that includes at least one camera mounted to the repositionable antenna structure.

8. A method for locating and managing tagged objects in a read zone using a mobile readpoint unit, the method comprising:
  establishing a repositionable read zone using at least one readpoint antenna coupled to an antenna tower, the antenna tower being affixed to a rotatable platform; and
  querying an electronic tag using the at least one readpoint antenna, the electronic tag coupled to the object and having tag information.

9. The method of claim 8, wherein the tag information includes at least a RFID identifier uniquely identifying the object.

10. The method of claim 9, further comprising correlating the location of the detected object to a communicating the tag information to a computing device, the computing device in communication with the at least one readpoint antenna.

11. The method of claim 10, further comprising executing an application on the computing device that instructs the mobile readpoint unit to automatically perform an inventory search.

12. The method of claim 8, further comprising extending the antenna tower to deploy the at least one readpoint antenna.

13. The method of claim 8, further comprising rotating the antenna tower to adjust the repositionable read zone.

14. The method of claim 10, further comprising transmitting a video signal to a remote operator.

15. A system for locating and managing tagged objects in a read zone using a mobile readpoint unit, the system comprising:
  an integrated mobile readpoint unit comprising:
    a housing, the housing including a rotatable platform;
    a power source located proximate the housing;
    at least one reader located proximate the housing, the reader being capable of reading from and writing to the at least one electronic tag, and receiving power from the power source;
    a repositionable antenna structure, the repositionable antenna structure including at least one readpoint antenna capable of communicating a signal to and from the electronic tag; the repositionable antenna structure including an antenna tower mounted to the rotatable platform, the antenna tower extendable to proportionally deploy the at least one readpoint antenna; and
  a processor, the processor operating to:
    establish a repositionable read zone using the at least one readpoint antenna coupled to an antenna tower; and
    query an electronic tag using the at least one readpoint antenna, the electronic tag coupled to the object and having tag information.

16. The system of claim 15, wherein the tag information includes at least a RFID identifier uniquely identifying the object.

17. The system of claim 15, wherein the processor further operates to correlate a position of a detected tag with an inventory facility location.

18. The system of claim 15, wherein the processor further operates to generate an alert to an operator to indicate an inventory event.

19. The system of claim 15, wherein the processor further operates to communicate proper placement of the object using the tag information.

* * * * *